United States Patent
Yoo (10) Patent No.: US 7,120,476 B2
(45) Date of Patent: Oct. 10, 2006

(54) SYSTEM AND METHOD FOR PROVIDING HANDS FREE OPERATION OF A PHONE

(76) Inventor: John Yoo, 530 E. 76 St., Apt. 15-G, New York, NY (US) 10021

( * ) Notice: Subject to any disclaimer, the term of this patent is extended or adjusted under 35 U.S.C. 154(b) by 385 days.

(21) Appl. No.: 10/375,609

(22) Filed: Feb. 27, 2003

(65) Prior Publication Data

US 2004/0185919 A1    Sep. 23, 2004

(51) Int. Cl.
*H04M 1/00* (2006.01)
(52) U.S. Cl. ............ 455/575.1; 455/575.3; 455/575.4
(58) Field of Classification Search .......... 455/564, 455/569.1, 575.2, 450, 430, 575.1, 90.1, 455/351; 379/430, 428.01, 433.01, 428.02
See application file for complete search history.

(56) References Cited

U.S. PATENT DOCUMENTS

| | | | |
|---|---|---|---|
| 5,590,417 A * | 12/1996 | Rydbeck | 455/575.2 |
| 6,230,029 B1 | 5/2001 | Hahn et al. | |
| 6,269,259 B1 | 7/2001 | Lai | |
| 6,370,401 B1 | 4/2002 | Baranowski et al. | |
| 6,510,325 B1 | 1/2003 | Mack, II et al. | |
| 2002/0137554 A1 | 9/2002 | Hanna et al. | |
| 2002/0193151 A1 | 12/2002 | Edreich | |
| 2004/0204120 A1* | 10/2004 | Jiles | 455/564 |
| 2004/0204160 A1* | 10/2004 | Zoraku et al. | 455/569.1 |

\* cited by examiner

*Primary Examiner*—Quochien B. Vuong
*Assistant Examiner*—Dominic E. Rego
(74) *Attorney, Agent, or Firm*—Keusey, Tutunjian & & Bitetto, P.C.; Susan Paik, Esq.

(57) ABSTRACT

A phone handset having a speaker and a microphone which are connected by a flexible connector to form a connected unit, wherein the connected unit is detachable from the handset to form a headset. In a preferred embodiment, the connected unit is automatically releasable from the handset via a release means, which when activated, forcibly inserts the speaker of the connected unit into a user's ear when a hands-free mode is desired. The connected unit may be physically and electrically connected to the handset via a retractable cord, or may comprise a wireless headset device. An apparatus according to the present invention advantageously provides vastly improved convenience in hands-free phone operation and uninterrupted phone conversation during user transitions between a handset mode and a hands-free mode and vice versa.

22 Claims, 7 Drawing Sheets

SYSTEM AND METHOD FOR PROVIDING HANDS FREE OPERATION OF A PHONE

BACKGROUND OF THE INVENTION

1. Technical Field

The present invention relates generally to headsets for phones, and more specifically, to a phone handset having a speaker and a microphone which are connected to form a connected unit, wherein the connected unit is detachable from the handset to form a headset.

2. Description of Related Art

With the proliferation of cordless phones and in particular, mobile phones, it is well-known that having to hold a phone handset while attempting to engage in other activities (i.e., driving) is a hazard. Indeed, in some locales, it is illegal to hold a mobile phone handset while driving.

As a result, numerous types of hands-free mobile phone devices and systems have been devised as remedies. Conventional systems typically involve a speaker-phone feature and/or a separate headset which can be plugged into a jack on the mobile phone. These systems have drawbacks however, including a lack of conversation privacy when using a speaker-phone feature. Further, a user who wishes to take advantage of a headset feature is disadvantaged by the inconvenience of having to carry around a separate headset with the mobile phone at all times.

In the latter case, this inconvenience is further compounded when a user has to switch between the phone handset and the separate headset during a telephone conversation. Typically, when a conventional separate headset is plugged into a phone handset for use, the speaker and microphone of the handset are de-activated. Thus, for a user to switch between handset and hands-free modes entails interrupting the conversation, taking the phone away from the ear, plugging the headset into the phone, placing the headset onto the head, and then properly affixing the earpiece while adjusting the microphone for correct placement.

Although a number of systems have been developed to try to remedy the inconvenience of having to carry a separate headset, such systems still disclose the use of a headset having a separate speaker and separate microphone and thus require an interruption in the user's conversation to attach the separate earpiece/microphone when switching to the separate headset. Thus, the prior art has failed to provide a truly convenient integrated system for hands-free phone operation.

Accordingly, an efficient and effective system and method for providing convenient hands-free operation of a phone, and in particular, without causing interruption in a user's conversation when alternating between a handset mode and a hands-free mode, is highly desirable.

SUMMARY OF THE INVENTION

The present invention is directed to an improved system and method for providing hands free operation for a phone handset. Advantageously, a system according to the present invention not only provides vastly improved convenience in hands-free phone operation, but also provides for uninterrupted phone conversation during user transitions between a handset mode and a hands-free mode and vice versa.

According to an aspect of the present invention, a hands-free phone apparatus is provided comprising a phone handset having a speaker and a microphone, and a connector for connecting the speaker to the microphone to form a connected unit. The connected unit is detachable from the phone handset to provide a hands-free headset wearable by a user.

In another aspect of the present invention, a method for providing hands-free operation of a phone headset is provided comprising the steps of providing a phone handset having a speaker and a microphone and providing a connector for connecting the speaker to the microphone to form a connected unit. The resultant connected unit is detachable from the phone handset to provide a hands-free headset.

In yet another aspect of the present invention, a system for providing hands-free operation of a phone is provided comprising a phone handset having a detachable speaker insertable into an ear canal of a user, a detachable microphone, a release mechanism, and a molded cavity therein. A formable detachable connector is provided for connecting the detachable speaker to the detachable microphone to form a detachable connected module receivable within the molded cavity. When the release mechanism is activated, the connected module is automatically detached from the handset and the detachable speaker is automatically inserted into the ear canal of the user to provide a hands-free headset.

These, and other aspects, features and advantages of the present invention will be described or become apparent from the following detailed description of the preferred embodiments, which is to be read in connection with the accompanying drawings.

DETAILED DESCRIPTION OF PREFERRED EMBODIMENTS

Figure 1A:
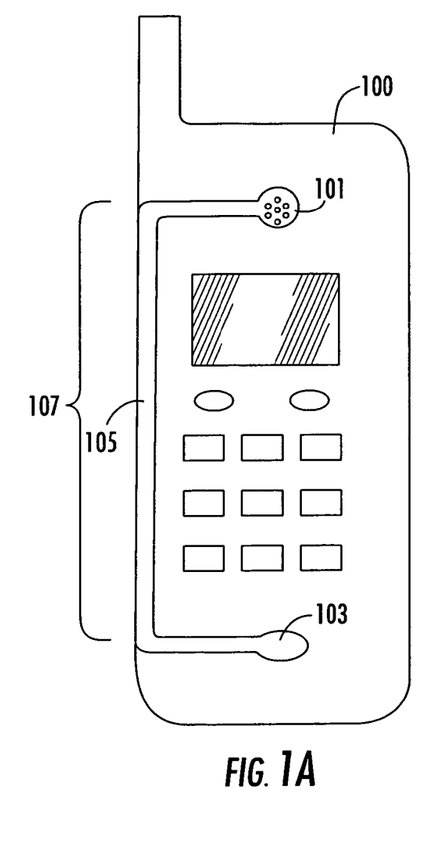
FIG. 1A is an exemplary illustration of a front view of a phone handset having a connector for joining a detachable speaker and a detachable microphone to form a detachable connected unit according to an embodiment of the present invention.

Referring now to the Figures, the illustration of FIG. 1A depicts a front view of a phone handset 100 having a detachable speaker 101 and a detachable microphone 103 joined by a detachable connector 105 to form a detachable connected unit 107 according to an embodiment of the present invention. It is to be noted that the handset 100 may comprise, for example, a cordless phone handset, a corded phone handset, or a mobile phone. The detachable connected unit 107 can be removed from the handset to form a headset wearable on a user's head (see FIG. 1C). In one embodiment, the detachable speaker 101 is preferably of a suitable size and shape to be insertable into an ear cavity of a user. Such a speaker may also include, e.g., a soft covering (e.g., comprised of foam material) to improve comfort when inserted within the ear.

The connector may be comprised of a rigid material (i.e., a same plastic material of the phone handset 100). In another embodiment, the connector is preferably comprised of a flexible and/or formable and/or resilient material to facilitate adjustment of the connected unit by the user when in use as a headset (e.g., to allow for adjustment of the microphone 103 into the desired position for speaking). Examples of suitable materials may comprise rubber-coated wire, moldable and/or deformable plastics/polymers, etc. Further, it is to be noted that either or both of the detachable speaker 101 and the detachable microphone 103 may be movable (e.g., rotatable and/or pivotable, etc.) with respect to their points of attachment to the connector to further provide adjustability of their positions by the user.

Figure 1B:
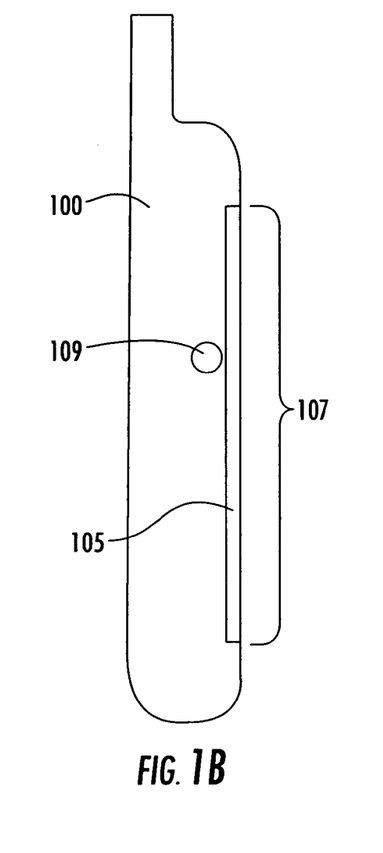
FIG. 1B depicts an exemplary illustration of a side view of the phone handset of FIG. 1A showing the detachable connected unit mounted onto the handset according to an aspect of the present invention.
Figure 1C:
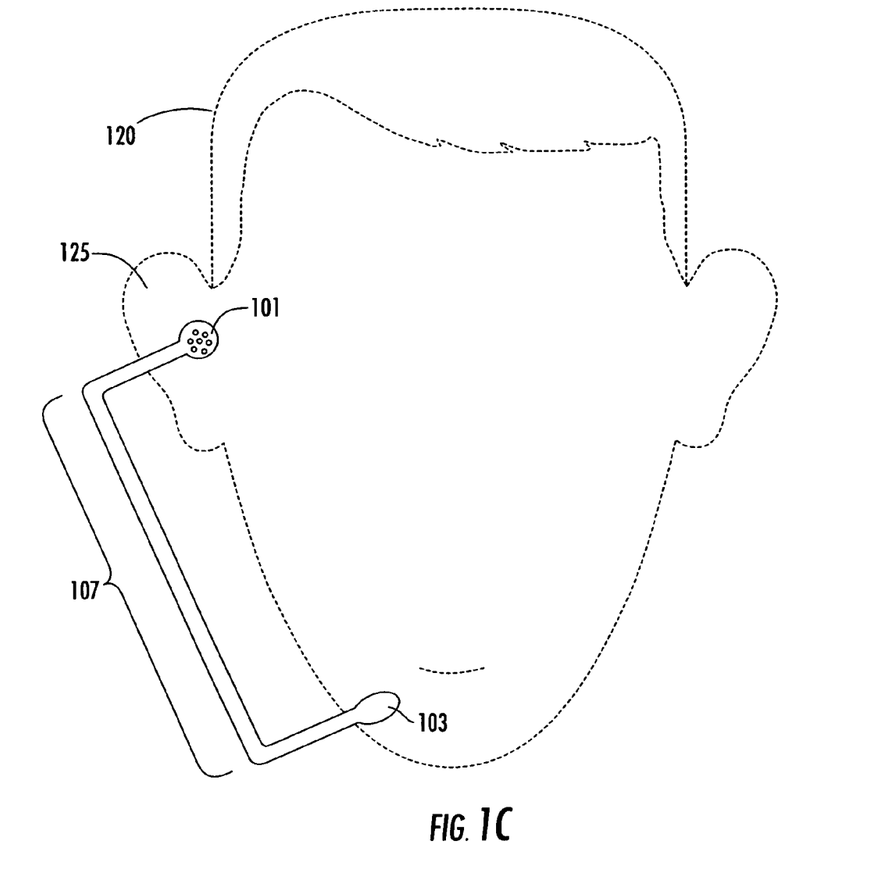
FIG. 1C is an exemplary front view illustration of the detachable connected unit of FIG. 1A in use as a headset on a user.
Figure 1D:
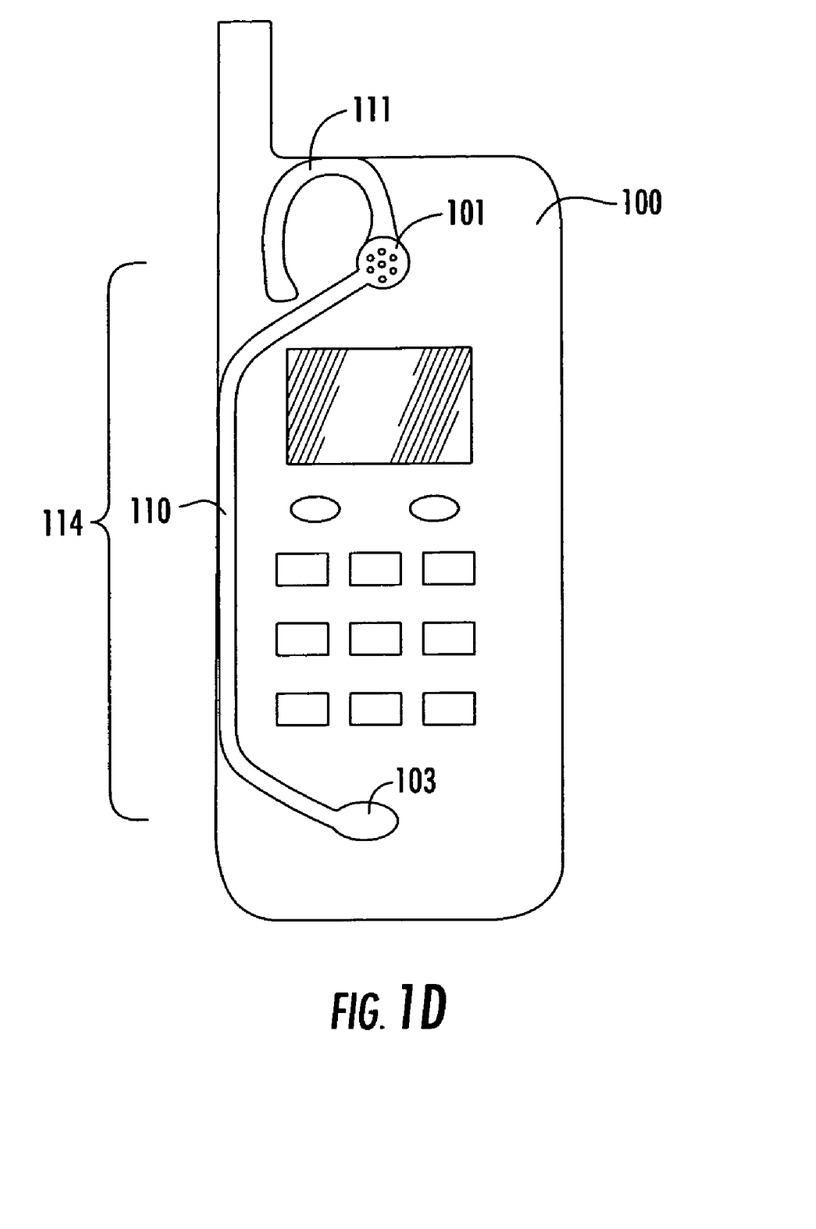
FIG. 1D depicts a detachable connected unit mounted on a handset having an ear hook according to an embodiment of the present invention.
Figure 2A:
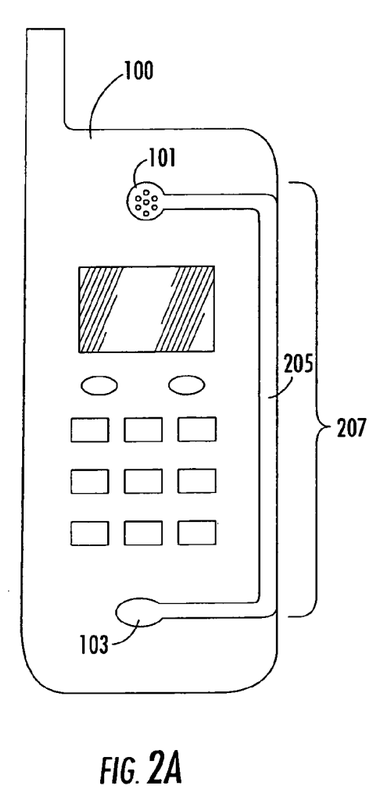
FIG. 2A depicts an alternate configuration of the detachable connected unit on a phone handset according to an embodiment of the present invention.
Figure 2B:
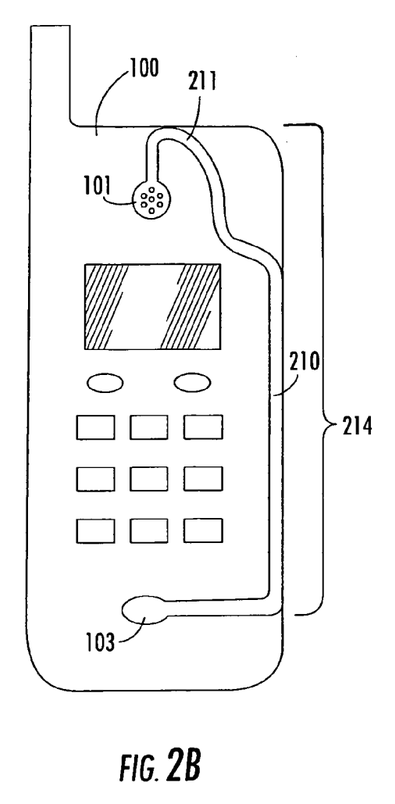
FIG. 2B depicts an alternate embodiment of a detachable connected unit on a phone handset, wherein a connector is shaped to have a built-in ear hook.
Figure 3:
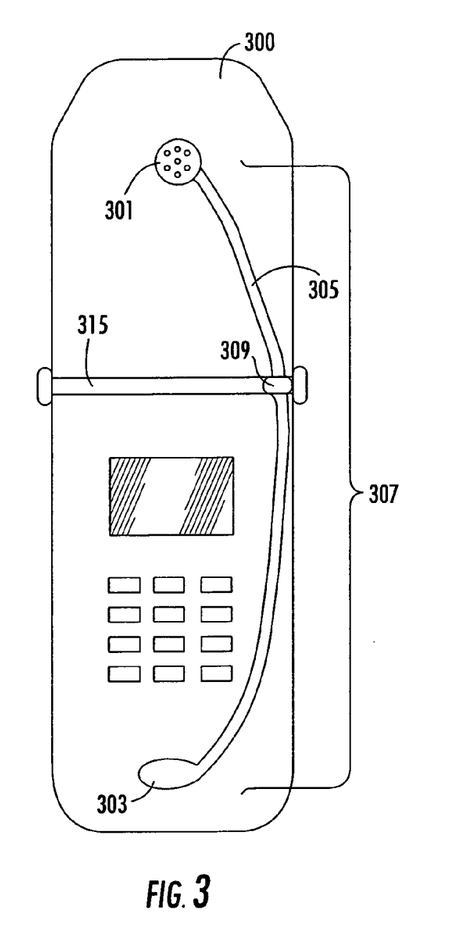
FIG. 3 depicts an exemplary illustration of a front view of a flip-down mobile phone having a detachable connected unit according to an embodiment of the present invention.

It is further to be noted that the connected unit may be positioned at any location on a phone handset and the particular designs shown in FIGS. 1–3 are for exemplary purposes only.

The phone handset 100 preferably includes a molded cavity formed therein conforming to the size/shape/dimensions of the detachable connected unit for mounting the connected unit therein, such that the connected unit is, for example, flush with the body surface of the handset when mounted. It is to be noted that the molded cavity may be of any shape or dimension in accordance with the shape/dimension of the connected unit to be inserted therein. Further, it is to be noted that the molded cavity may be disposed at any part of the phone handset and the particular positions inherently shown in FIGS. 1–3 are for exemplary purposes only.

FIG. 1B is an exemplary illustration of a side view of the phone handset 100 of FIG. 1A showing the detachable connected unit 107 mounted within a molded cavity of the handset according to an aspect of the present invention.

It is to be noted that the handset preferably includes a fastening and/or "locking" mechanism to secure the connected unit onto/into the handset during use in the handset mode. Such a fastening mechanism may comprise, for example, means for securing the connected unit onto the handset, e.g., via compressive means, suction, spring clips, retractable clamps, spring-loaded pegs, etc.

Although the connected unit 107 may be manually detachable from the handset 100, in one embodiment the handset 100 may include a release mechanism such as, for example, a button 109 that when pressed, automatically detaches the connected unit 107 from the handset 100. It is to be noted that such a release mechanism may be located at any position on the handset. Preferably, the release mechanism, when activated, releases any fastening mechanism employed and automatically and forcibly pushes the connected unit out of the molded cavity of the handset within which the connected unit resides. Such forcible release may be enabled by, for example, a lever, rod or other implement which is caused to apply force to any part of the connected unit, thus causing the connected unit to be lifted out of the molded cavity.

In one embodiment, the detachable speaker 101 of the connected unit 107 can thus be caused to be automatically inserted into the user's ear when a hands-free mode is desired, thereby conveniently and automatically providing a hands-free headset. For example, in operation, if a user is using the handset 100 in a handset mode (i.e., holding the handset 100 to his/her ear) and desires to switch to a hands-free mode, the user may activate the release mechanism (e.g., press the button 109), which automatically and forcibly detaches the connected unit 107 from the molded cavity and automatically inserts the speaker 101 into the ear canal of the user to provide a hands-free headset. This process may be executed even while the user is speaking. In effect, in one embodiment, the present invention provides a means for switching from a handset mode to a hands-free headset mode at the push of a button without any interruption in the conversation whatsoever.

As a result, the user can switch to a hands-free mode while avoiding interruptions in the conversation as well as eliminating the inconvenience of having to carry and attach a separate headset. Further, the present invention eliminates the possibility of a user not being able to convert to a hands-free mode due to a headset which has been lost, misplaced, or simply forgotten. Essentially, the present invention provides in one aspect a headset feature which is integrated into a phone handset.

In addition, the present invention provides superior convenience in alternating not only between a handset to a hands-free mode, but vice versa. For example, to switch to a handset mode from a hands-free mode, the user may simply place the handset to the ear, and while aligning the connected unit 107 with the molded cavity in the handset, apply pressure to 'snap' the connected unit back into place within the molded cavity while continuing his/her conversation uninterrupted.

FIG. 1C is an exemplary front view illustration of the detachable connected unit 107 of FIG. 1A in use as a headset on a user represented by a dashed-line head 120. In this embodiment (e.g., a hands-free headset mode embodiment), the detachable speaker 101 is insertable into the user's ear 125, thus providing a means for holding the connected unit 107 in place on the user's head 120 for use as a headset. The connected unit 107 is preferably fully adjustable as mentioned above and can thus be positioned/arranged as desired by the user 120.

The use of the connected unit 107 as a headset as portrayed in FIG. 1C is for exemplary purposes only and other positions and/or configurations of the connected unit 107 as discussed in this specification may be contemplated. Further, the headset as shown in FIG. 1C may be wireless or corded (not shown), both embodiments of which are discussed in greater detail in FIGS. 5 and 6 below.

In an alternative embodiment, FIG. 1D shows a detachable connected unit 114 comprised of a connector 110 joining the detachable speaker 101 and the detachable microphone 103, wherein the connected unit 114 includes an ear hook 111 for assisting in securing the connected unit 114 to the user's ear when in use as a headset. In this embodiment, the ear hook 111 may be attached onto the connected unit 114 as shown, for example, in FIG. 1D. It is to be noted, however, that other positions of attachment of the ear hook may be contemplated and the embodiment shown with respect to FIG. 1C is for exemplary purposes only.

Preferably, the ear hook 111 is formed of a flexible and/or formable and/or resilient material which may be shaped/ formed to comfortably fit onto a user's external ear. The ear hook 111 may also be movable (e.g., rotatable and/or pivotable, etc.) with respect to its point of attachment on the connected unit 114 so as to enable the user to adjust the ear hook 111 to fit, for example, on either his/her left or right ear as desired.

Further, the phone handset 100 preferably includes a molded cavity formed therein shaped to accept the ear hook 111, such that the ear hook may be inserted within the molded cavity when, e.g., the connected unit 114 is not in use. Preferably, the ear hook 111 is flush with the phone handset 100 when installed within such cavity. It is also to be noted that the ear hook 111 may be detachable from the connected unit 114.

FIG. 2A shows an alternate configuration of a detachable connected unit on a phone handset according to an embodiment of the present invention, wherein a connected unit 207 comprised of the detachable speaker 101 and the detachable microphone 103 joined by a connector 205 is disposed on a right side of the phone handset 100. This embodiment may be preferable, for example, for users who typically hold phones to their right ears the majority of the time during use. However, it is to be noted that the connector, being preferably comprised of a flexible/formable material, and the speaker 101 and the microphone 103 further being preferably movable with respect to the connector as discussed above, facilitates and provides complete adjustability of the connected unit by the user such that use of the connected unit on either the right or left ear may be contemplated by any embodiment of the present invention.

FIG. 2B depicts an alternate embodiment of a detachable connected unit 214, wherein a connector 210 is shaped to have a built-in ear hook 211 at a first end proximate to the speaker 101. This embodiment may be preferable for a user who, e.g., uses his/her right ear when using a phone, although as discussed above, the connected unit provides complete adjustability by a user to enable use with, e.g., either ear. Other shapes and/or designs of the ear hook may be contemplated, and the embodiment shown in FIG. 2B is for exemplary purposes only.

It is to be noted that the phone handset 100 preferably includes a molded cavity formed therein which is appropriately shaped to accept the detachable connected unit 214 having the built-in ear hook 211, such that the detachable connected unit 214 may be inserted within the molded cavity. Preferably, the detachable connected unit 214 is flush with the phone handset 100 when installed within such cavity.

FIG. 3 depicts an exemplary illustration of a front view of a flip-down mobile phone 300 having a detachable connected unit 307 comprised of a connector 305 joining a detachable speaker 301 and a detachable microphone 303 according to an embodiment of the present invention. The connector 305 preferably includes a joint region 309 disposed at a location along its length which coincides with a hinge 315 of the flip-down phone 300, when the connected unit 307 is installed into the flip-down phone. Although the connector itself is preferably flexible and/or formable as described in above, the joint region 309 enables the connected unit 307 to better conform to the flip-down phone when, for example, the flip-down phone 300 is in a closed position.

It is to be noted that the joint region 309 may comprise for example, any means which provide additional elasticity, flexibility, expansion/contraction, stretching/compressing ability, etc. such that the connected unit is imparted with the ability to, e.g., elongate or retract as needed when the flip-down phone 300 is closed or opened, respectively. Examples of suitable materials may include a bellows construction, a reduced cross-sectional area, or similar means to provide the proper flexibility required. In addition, the joint region 309 may be constructed to further permit rotation, pivoting, etc. to further provide adjustability of the connected unit 307 when used as a headset by the user. Further, the joint region 309 is preferably constructed to preserve any electrical connections through the joint.

It is to be noted that the connector 305 may be disposed at any location on the mobile phone 300 to workably connect the speaker 301 and the microphone 303 and can be of any shape or configuration, and the embodiment shown in FIG. 3 is for exemplary purposes only.

Figure 4:
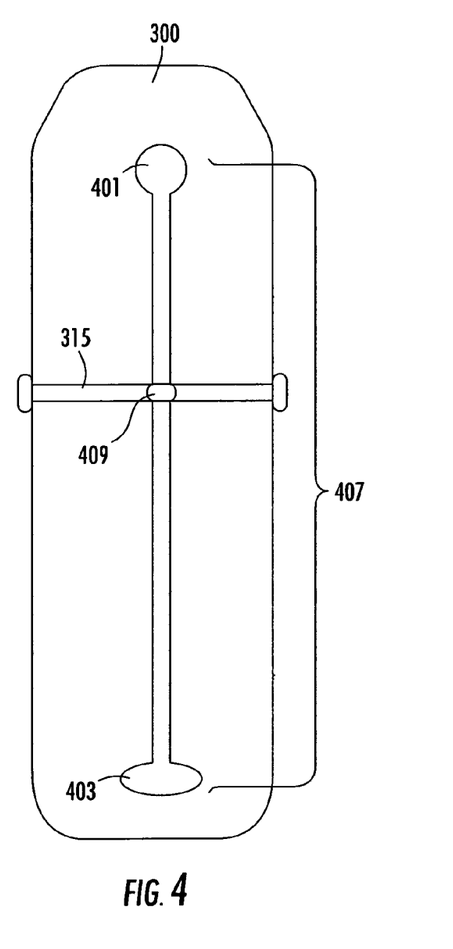
FIG. 4 depicts an alternate embodiment showing a back view of the flip-down mobile phone of FIG. 3 having a detachable connected unit disposed within a rear side of the flip-down phone according to an aspect of the present invention.

FIG. 4 depicts an alternate embodiment showing a back view of the flip-down mobile phone 300 having a detachable connected unit 407 disposed within a rear side of the flip-down phone 300 according to an aspect of the present invention. In this embodiment, the connected unit 407 comprises a speaker 401, a microphone 403, and preferably includes a joint region 409 disposed at a location along its length which coincides with the hinge 315 of the flip-down phone 300 when the connected unit 407 is installed onto the flip-down phone.

It is to be noted that the connected unit in any of the embodiments of the present invention may include an independent volume control means, so that the user may adjust the volume of the detachable speaker and/or the detachable microphone when using the connected unit as a headset.

Figure 5:
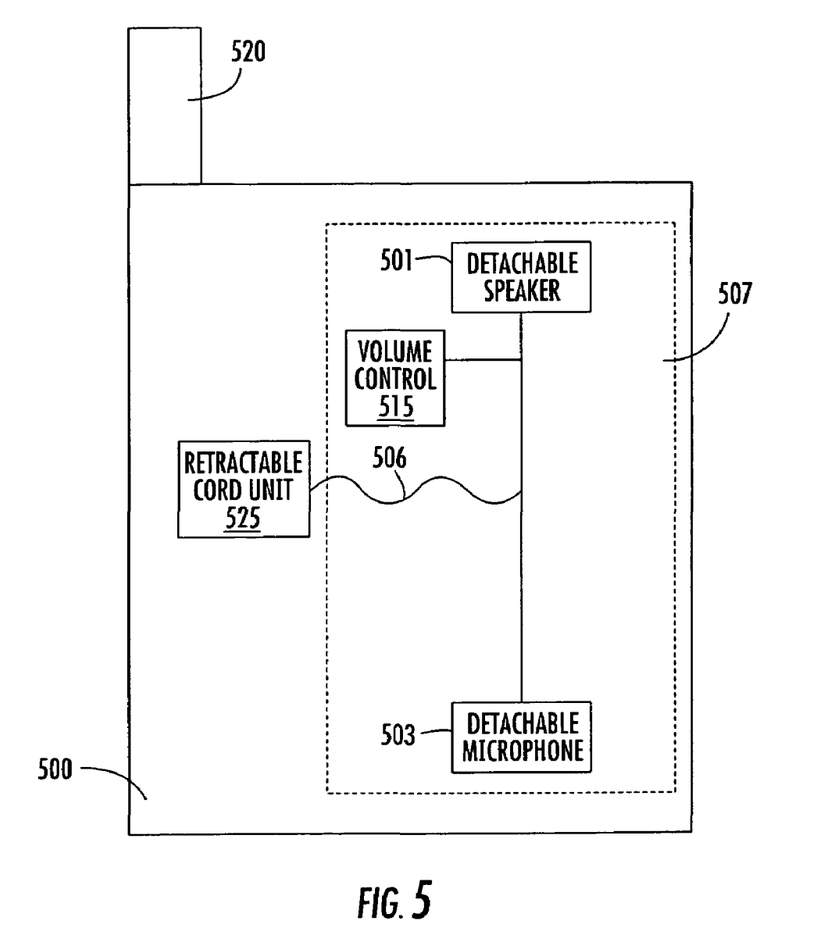
FIG. 5 is an exemplary schematic illustration of a phone handset having a detachable connected unit, wherein the detachable connected unit is connected to the handset via a retractable cord stored on the phone headset according to an aspect of the present invention.

FIG. 5 is an exemplary schematic illustration of a phone handset 500 having a detachable corded connected unit 507, wherein the corded connected unit 507 is connected to the handset 500 via a retractable cord 506 stored on the phone headset 500 according to an aspect of the present invention.

The detachable corded connected unit 507 is comprised of a detachable speaker 501 physically and communicatively connected to a detachable microphone 503. The corded connected unit 507 may include an independent volume control 515 for allowing a user to control the volume of either or both of the speaker 501 and the output of the microphone 503.

In this embodiment, the retractable cord 506 provides physical and electrical connection of the connected unit with the phone handset 500 to provide a communication link between the two. As such, when the corded connected unit 507 is operated as a headset, it preferably uses the power supply, an antenna 520, etc. of the phone handset 500. It is to be noted that the cord 506 may be attached at any point along the connected unit 507.

The retractable cord 506 is preferably stored in a retractable cord unit 525 which may be situated at any suitable location on the phone handset 500. The retractable cord unit 525 may be included internally within the handset 500, or attached externally to the handset 500. The retractable cord unit 525 includes a retractable mechanism to retract the cord 506 and an aperture suitably large enough to permit passage of the cord yet small enough to not permit passage of any part of the connected unit 507. Such a retractable mechanism includes any mechanism for retracting a cord and permitting extension of at least a part of it.

The retractability of the cord 506 helps prevent the cord from becoming entangled when the connected unit 507 is detached from the handset 500, and further prevents misplacement of the connected unit when separated from the handset 500. In addition, the retractable cord facilitates automatic replacement of the connected unit 507 into the handset 500, since it can assist in pulling and guiding the connected unit 507 back into the molded cavity of the handset 500 when the user desires to switch to a handset mode and activates the retractable mechanism.

It is to be contemplated that a stop mechanism may also be provided in the retractable cord unit 525 for holding the cord 506 at particular extended positions so that it is not under tension from the retractable mechanism. Such a stop mechanism includes any mechanism for releasably holding a cord at least at one particular extended position. Examples of stop mechanisms include mechanisms that hold and release the cord through force applied to the cord itself or through other devices such as a release button external to the retractable cord unit 525 and attached to a mechanism internal to the unit 525 to hold the cord in place. Manipulation of the release button, in the latter example, activates and releases the stop mechanism.

Figure 6:
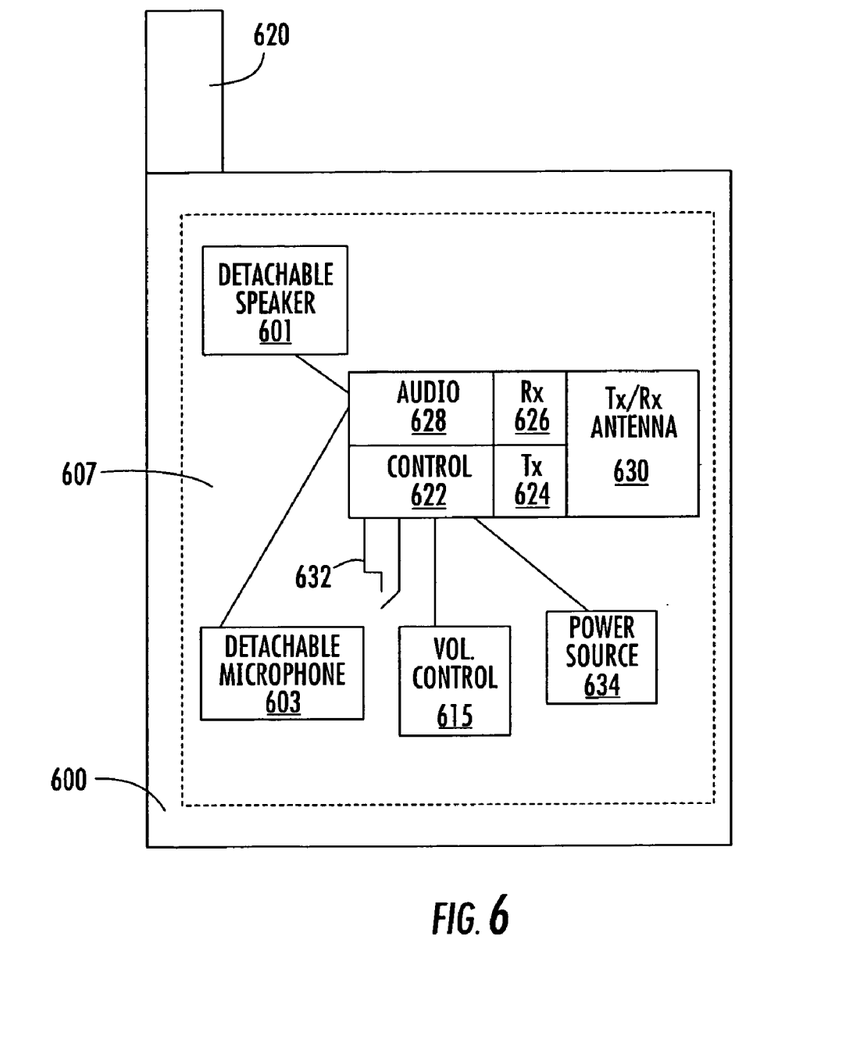
FIG. 6 is an exemplary schematic illustration of a phone handset having a wireless detachable connected unit according to an aspect of the present invention.

FIG. 6 is an exemplary schematic illustration of a phone handset 600 having a wireless detachable connected unit 607 according to an aspect of the present invention. The wireless connected unit 607 preferably includes an independent power source 634 for powering the connected unit when in use as a headset, as well as an independent volume control 615. The power source 634 may comprise, e.g., a battery pack attached to/carried within the wireless connected unit 607.

While the phone handset 600 includes an antenna 620, within the wireless connected unit 607 there is an independent transmitter and receiver antenna 630. The independent antenna 630 is connected to a transceiver module which includes a wireless connected unit receiver 626 and a wireless connected unit transmitter 624. The receiver 626 is connected to supply audio signals to an audio amplifier 628 which is also connected to the microphone 603 and the speaker 601. Similarly, the transmitter 624 is supplied with audio signals from the audio amplifier 628 and supplies wireless transmission signals to the antenna 630.

A control 622 controls all of the elements 624, 626 and 628 within the wireless connected unit 607. The control 622 is also connected to the on/off switch 632 and the volume control 615. It is to be noted that the elements 622 to 628, inclusive, are all part of the transceiver module.

Control 622 is preferably enabled such that Tx 624 and Rx 626 are operational when the wireless connected unit 607 is detached from the phone handset 600. Likewise, a handset 600 to connected unit 607 wireless communication mode is enabled when the speaker 601 and the microphone 603 are detached from the handset 600. When the wireless connected unit 607 is attached to the handset, the power supply, antenna, etc. of the handset 600 are preferably employed to operate the speaker 601 and the microphone 603.

Although illustrative embodiments of the present invention have been described herein with reference to the accompanying drawings, it is to be understood that the invention is not limited to those precise embodiments, and that various other alterations, modifications and improvements may be affected therein by one skilled in the art. Such alterations, modifications and improvements are intended to be within the scope and spirit of the present invention. Accordingly, the foregoing description is by way of example only and is not intended to be limiting. This invention should be limited only by the claims and equivalents thereof.

What is claimed is:

1. A communication apparatus comprising:
    a phone handset comprising a flip-down mobile phone having a hinge, the handset having:
        a molded cavity disposed on a front keypad face;
        a single speaker and a single microphone connected to one another via a connector to form a connected unit being receivable within the molded cavity, the connector including a joint region for allowing the connector to conform to the hinge of the flip-down mobile phone during opening and closing of said flip-down mobile phone, the connected unit for use in a handset mode in which the single speaker and the single microphone are embedded within said molded cavity disposed on said front keypad face, and in a headset mode, in which said connected unit is detachable from the phone handset to provide a hands-free headset wearable by a user; and
        a release mechanism located on a side face of the phone handset for automatically detaching the connected unit from the handset and inserting the speaker directly into the user's ear canal when the user places the handset to the ear.

2. The communication apparatus of claim 1, wherein the connector is comprised of a flexible material.

3. The communication apparatus of claim 1, wherein the connected unit includes a flexible ear hook for placement over the user's outer ear to secure the headset onto the user.

4. The apparatus of claim 3, wherein the handset further includes an additional shaped molded cavity disposed on said front keypad face adapted for receiving the ear hook therein.

5. The communication apparatus of claim 1, wherein the phone handset includes a fastening mechanism for securing the connected unit onto the handset.

6. The communication apparatus of claim 1, wherein the headset wirelessly communicates with the phone handset during operation.

7. The communication apparatus of claim 1, wherein the headset is physically and electrically connected to the phone handset via a cord.

8. The communication apparatus of claim 7, wherein the cord is retractable within a retractable cord unit on the phone handset.

9. A method for alternating between a handset mode and a hands-free mode during operation of a phone, the method comprising the steps of:
    providing a phone handset comprising a flip-down mobile phone having a hinge, the handset having a molded cavity disposed on a front keypad face, a release mechanism located on a side face of the phone handset, and a single speaker and a single microphone connected to one another via a connector to form a connected unit receivable within the molded cavity, the connector including a joint region for allowing the connector to conform to the hinge of the flip-down mobile phone during opening and closing of said flip-down mobile phone;
    embedding the connected unit within said molded cavity for using the phone in a handset mode; and
    detaching the connected unit from the front keypad face of the phone by activating the release mechanism for using the phone in a headset mode.

10. The method of claim 9, wherein the connector is comprised of a flexible material.

11. The method of claim 9, further comprising the step of providing a flexible ear hook attached to said connected unit for placement over the user's outer ear to secure the headset onto the user.

12. The method of claim 11, further comprising the step of providing an additional shaped molded cavity disposed on said front keypad face adapted for receiving the ear hook therein.

13. The method of claim 9, further comprising the step of providing a fastening mechanism for securing the connected unit onto the handset.

14. The method of claim 9, further comprising the step of wirelessly communicating between the phone handset and the connected unit.

15. The method of claim 9, wherein the headset includes a physical and electrical connection to the phone handset via a cord.

16. The method of claim 15, wherein the method further includes retracting the cord within a retractable cord unit on the phone handset.

17. The method of claim 9, wherein when the handset mode is desired, further comprising the steps of placing the handset adjacent to the user's ear canal while aligning the connected unit with the molded cavity and applying pressure to the handset to forcibly insert the connected unit within the molded cavity.

18. A system for alternating between a handset mode and a hands-free mode during operation of a phone without interrupting a user's conversation, the system comprising:

a phone handset comprising a flip-down mobile phone having a hinge, the handset having a molded cavity disposed on a front keypad face, and a single speaker and a single microphone connected to one another via a connector to form a connected module being receivable within the molded cavity, the connector including a joint region for allowing the connector to conform to the hinge of the flip-down mobile phone during opening and closing of said flip-down mobile phone, the connected module for use in a handset mode in which the single speaker and the single microphone are embedded within said molded cavity disposed on said front keypad face, and in a headset mode in which said connected module is detachable from the phone handset to provide a hands-free headset wearable by a user.

19. The system of claim 18, wherein when the handset mode is desired the handset is placed adjacent to the user's ear canal while aligning the connected module with the molded cavity and pressure is applied to the handset to forcibly insert the connected module within the molded cavity.

20. The system of claim 18, further comprising a flexible ear hook attached to said connected module for placement over the user's outer ear to secure the headset onto the user.

21. The system of claim 20, wherein the handset further includes an additional shaped molded cavity disposed on said front keypad face adapted for receiving the ear hook therein.

22. The system of claim 18, further comprising a release button located on a side face of the phone handset for providing automatic detachment of the connected module from the handset when deployed to automatically insert the speaker into the ear canal of the user when the user places the handset to the ear for use of the connected module in the headset mode.

* * * * *